W. CLEMSON.
MACHINE FOR GRINDING SAWS.
No. 24,196.　　　　　　　　　　Patented May 31, 1859.
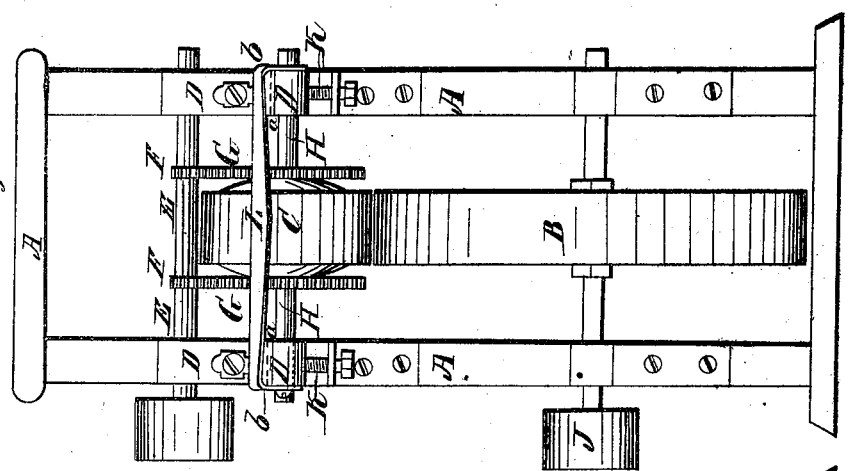
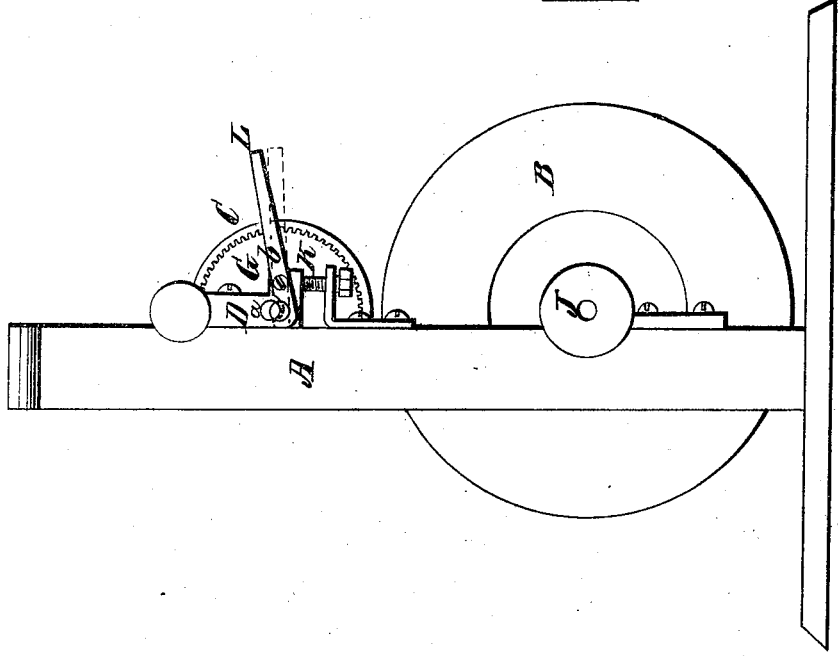
Witnesses:
Marshall Wyman
Albert L. Richardson
Inventor:
Wm Clemson

UNITED STATES PATENT OFFICE.

WILLIAM CLEMSON, OF EAST WOBURN, MASSACHUSETTS.

MACHINE FOR GRINDING SAWS.

Specification of Letters Patent No. 24,196, dated May 31, 1859.

*To all whom it may concern:*

Be it known that I, WILLIAM CLEMSON, of East Woburn, in the county of Middlesex and State of Massachusetts, have invented a new and useful Improvement in Machines for Grinding Saws; and I do hereby declare that the following is a full, clear, and exact description thereof, reference being had to the accompanying drawings, and to the letters of reference marked thereon, of which—

Figure 1, represents a side elevation of the machine, and Fig. 2, is a front view of the same.

Similar letters of reference indicate corresponding parts in both figures.

My invention is an improvement upon the patent granted to me May 25th 1858, and consists in arranging the top roll upon the frame so as to produce the requisite degree of pressure upon the saw in grinding by the weight of said roll; and in adjusting the roll to the surface of the saw, to be ground, described, represented and specified as follows:—

A, is the main frame of the machine, B, the grindstone and C, the roll, which is supported in adjustable bearing plates D, D, either side of the frame, A.

E, is the pinion shaft having its bearings in plates D, D, and upon which shaft are keyed two pinions, F, F, which respectively mesh into teeth of gear wheels G, G. These wheels are fixed upon the roll shaft H, and on each side of the roll C, by which motion is communicated to the roll. Immediately below this roll is the grindstone, the diameter of which is much greater than that of the roll C, this is rotated by a band wheel J, fixed upon its shaft outside of the frame A.

The roll shaft H, is capable of receiving a vertical play in its boxes *a*, *a*, which are elliptical, by means of lever L, the arms *b*, *b*, of which are pivoted to the adjustable bearing plates D, D, so that by depressing the lever, the roll C, is raised horizontally from the saw, which is placed between the periphery of the roller and grindstone; and when the lever is raised free from the shaft, the bearing plate being so adjusted that the space between the periphery of the roll and that of the grindstone will be less than the thickness of the saw to be ground, and the saw placed between the same; the roller will be slightly raised to admit the saw when it will equally adapt itself to the entire surface of the saw at the same time equalizing the feed by pressing upon the saw with its own gravity.

Another advantage of the elliptical bearings is, that in grinding a saw which is reduced in thickness from the teeth to the back or when an uneven plate is being ground the pressure of the roll upon the saw is effected free of the bearings and a uniform and continuous "bite" is obtained from one end of the saw to the other, this effect being desirable as the major portion of saw plates are rolled true and require but a uniform grinding to remain so.

K, K, are two adjusting feed screws by which the plates D, D, are respectively adjusted at the same time also are the roll, gears, and their shafts; and by setting up one of these plates, as in grinding narrow saws, the roll is thrown out of a horizontal line with the grindstone and consequently only a part of the face or periphery bears upon the saw at the same time the double gearing keeps the roll steady and prevents it from tilting or canting which would be the case if only one set of gearing was employed.

What I claim as my invention and desire to secure by Letters Patent, is,

The elliptical bearings *a*, *a*, lever L, and double gearing F, F, & G, G, in combination with the adjustable bearing plates D, D, when all are arranged substantially as, and for the purposes herein above specified.

WM. CLEMSON.

Witnesses:
WILLIAM WARD,
ALBERT L. RICHARDSON.